H. B. JONES.
PUMP.
APPLICATION FILED OCT. 10, 1914.
1,240,855.
Patented Sept. 25, 1917.
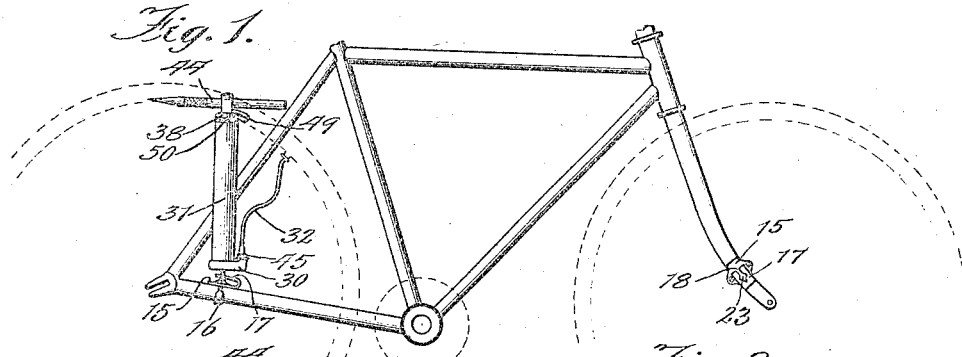
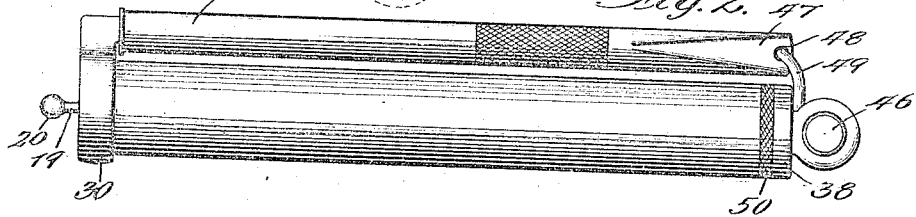
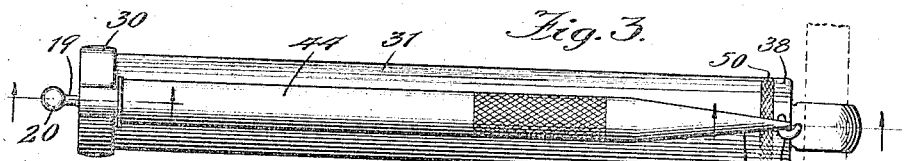
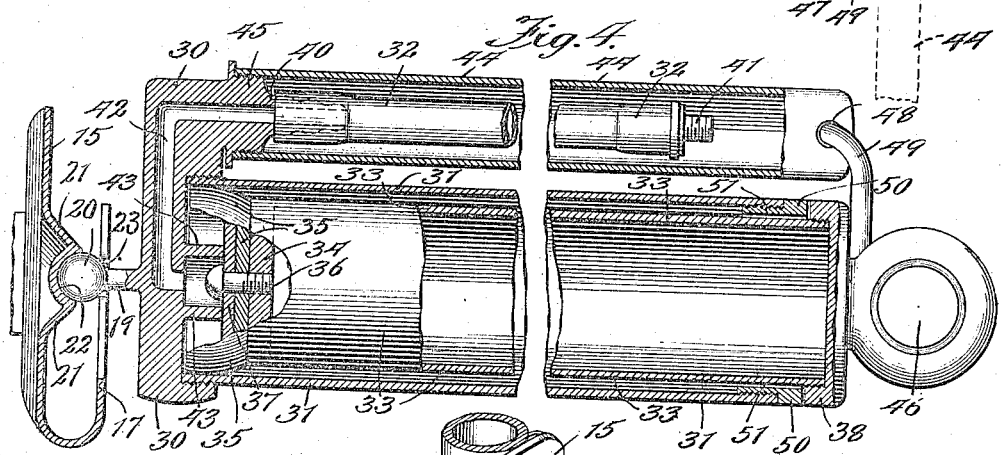
Inventor:
Howard B. Jones
By Luther Johns, Atty.
Witnesses:

UNITED STATES PATENT OFFICE.

HOWARD B. JONES, OF EVANSTON, ILLINOIS.

PUMP.

1,240,855.  Specification of Letters Patent.  Patented Sept. 25, 1917.

Application filed October 10, 1914. Serial No. 866,050.

*To all whom it may concern:*

Be it known that I, HOWARD B. JONES, a citizen of the United States, and resident of Evanston, in the county of Cook and State of Illinois, have invented certain new and useful Improvements in Pumps, of which the following is a specification.

My invention relates to pumps, and more particularly to pumps for inflating vehicle tires. Its principal objects are to provide convenient means for inflating tires on the vehicle; to provide a compact form of tire pump; and one whereby the operator may use both hands and exert strong pumping forces upon the piston without dislodging the pump from its mounting; also one in which a flexible tubular element is well protected from injury when not in use; further, a pump having provisions constituting it a receptacle, as for a tire repair outfit, and a pump in which an element thereof constitutes a repair tool; also to provide a pump in which the piston is maintained well lubricated and the oil or grease therefor is not forced into the discharge passage; and, generally, to provide a pump which is strong and durable, of simple construction, of light weight, and effective in operation. Other objects will appear hereinafter.

In the accompanying drawings, which form a part of this specification, I have illustrated a preferred embodiment of a pump including the several features of my invention. In these drawings Figure 1 is a side view of a cycle frame with pump-holding elements in convenient position thereon, and with the pump attached to one of them as in use;

Fig. 2 is a side view of the pump and tube casing thereon as when not in use;

Fig. 3 is a view of the device of Fig. 2 when given a one-quarter turn, this view also showing in dotted lines the position of the pump handle;

Fig. 4 is an enlarged fragmentary medial longitudinal view, largely in section, on a vertical plane through Fig. 2, or on a horizontal plane through Fig. 3 in the direction of the arrows; and Fig. 5 is a perspective view of a simple and preferred form of pump-holding device in position on a frame part.

In the illustrated use of my improved pump the socket element 15 of a ball and socket joint is clamped, suitably by means of a U-bolt or carriage strap 16, to front and rear forks of a bicycle, but the same may conveniently be clamped upon the spokes of an automobile or upon any convenient part adjacent to the tire. In the preferred form this socket piece 15 is a stamping having an outer bifurcated leaf element 17 forming the slot or passageway 18 for the neck or shank 19 of the ball 20, the main body portion of the socket element 15 preferably having an upstanding portion 21 provided with a circular recess or depression 22 constituting a seat for the ball 20, this recess 22 being opposite the enlargement 23 of the guide-way 18, which enlargement 23 is not sufficient to permit the ball 20 to pass therethrough. It will readily be appreciated that when the socket element 15 is in operative position on a vehicle the pump carrying the ball 20 may be secured for use by passing the neck 19 through the passageway 18 and forcing the ball into the recess 22 against the spring pressure of the leaf element 17, where it is tightly held, and, importantly, is held positively from being withdrawn from the socket by any pumping force brought to bear in the direction of the axis of the pump, the construction permitting the pump to be swung about in all convenient directions when in use and permitting its ready removal after the tire is filled. Thus a single pump will serve for all the wheels of a vehicle, and with but a small section of flexible tubing, which tubing may be suitably housed.

The ball 20 is preferably integral with the casting 30, which constitutes a mounting for the pump cylinder 31 and the flexible tube 32, the tube 32 preferably lying alongside the cylinder 31 when not in use.

The piston for the pump includes the inner metallic tube or piston stem 33 having a plug 34 secured thereto against which plug is secured the leather or other flexible washer 35 by means of the screw 36 and washer 37. The other end of the inner tube or piston stem 33 is provided with a cap 38 threaded upon the tube 33. The hollow piston stem 33 thus forms a convenient receptacle for tire cement, patches, small tools and the like useful in repairing tires, and is especially advantageous in that these repair articles ordinarily suffer considerable damage by being intermixed with the ordinary tools of the automobilist's or motorcyclist's kit.

The flexible tube 32 is frictionally held upon the corrugated stud 40 upon the mounting 30, the other end of the tube carrying a nipple 41 for engagement with the nipple of the tire. No check valve is required in the pump apparatus as the tire nipple is universally provided with one. An air passage 42 connects the interiors of the pump and tube 33. An annular projection 43 suitably integral with the mounting 30 having a hollow interior communicating with the air passage 42 is adapted to prevent the crushing of the flexible washer or piston head 35, as well as to provide the annular recess about it adapted to contain grease for lubricating the plunger head 35, the projection 43 preventing such grease from being forced into the air passage 42.

An important advantage is secured in protecting the flexible tube 32 against injury when the pump is not in use, which I accomplish by means of the preferably cylindrical cover 44 readily removably secured to a pump part, as by threading the same upon a nipple-like portion 45 of the mounting 30, this tube or cover 44 preferably extending longitudinally with the pump cylinder 31 and preferably completely incasing the flexible tube. A further advantage is secured by providing the cap 38 with the opening 46 of such diameter as to receive the cover 44 whereby the latter serves as a handle for the pump, as illustrated in Figs. 1 and 3. Another advantage is secured in tapering the cover 44 as at 47 to a substantially sharp line, by which the end is closed and a prying tool is provided for removing tires and in similar work, or it may be employed as a screw driver or otherwise, this kind of a tool being particularly useful in repair work about a vehicle. The tapering sides of the cover 44 have the further advantage of permitting a hole, as 48, to be formed near the edge whereby a locking element, as 49, consisting suitably of a piece of wire and secured to the cap 38 may be caused to engage or hook through this tapered portion whereby the cover 44 is supported at its otherwise free end, and at the same time the cap 38 is locked against withdrawal when the pump is not in use, which is important in maintaining the pump in small compass and preventing dirt from entering the pump cylinder. The piston stem 33 is suitably guided and its stroke limited by a bushing 50 threaded into the cylinder 31, and this bushing is provided with a plurality of air ducts 51 to permit a free flow of air into the cylinder, it being well understood that when the piston is partially withdrawn, the check valve in the nipple of the tire prevents air from passing back through the flexible tube 32 and that the partial vacuum in the pump cylinder causes air to pass around the outer sides of the plunger 35, such air being forced through the passage 42 on the ensuing stroke.

Upon slightly turning the cap 38 the locking element 49 is freed from the opening 48, whereupon the cover 44 may be unscrewed from the mounting 30, inserted in the opening 46 as a handle, the ball 20 snapped into the socket element 15, and the nipple 41 secured to the tire nipple, whereupon pumping operations may be begun. The operator may thus use two hands in working the pump and as he naturally draws the piston head with considerable force against the bushing 50, the provision of a ball and socket connection which will not separate under such force is highly advantageous. Heretofore connections have been made in bicycle pumps necessitating the holding of the pump with one hand while the piston is operated with the other, among the disadvantages of which are not only a loss of power, but the heat generated in the pump by friction frequently becomes unbearably great.

While I have illustrated and described a preferred embodiment of these improvements, various modifications may be made of the same without departing from the spirit of the invention. Reference should therefore be had to the appended claims to determine the scope of the improvements herein set forth.

I claim:

1. The combination of a tire pump, a flexible tube on said pump, said tube being adapted to be secured upon the nipple of a tire, and a protective cover for the tube, said cover being adapted to lie along the side of the pump and being readily removably secured to a pump part.

2. The combination of a tire pump having a pump cylinder, a flexible tube, a tubular cover adapted to inclose said tube, said cover being readily removably secured to a pump part so as to lie along one side of said cylinder when in its tube-inclosing position.

3. In a tire-inflating pump, the combination of a pump cylinder, a mounting for the same, a piston within said cylinder, a flexible tube secured to said mounting, said mounting having means providing a passageway for air from the interior of said cylinder to the interior of said tube, and a protective casing adapted to inclose said flexible tube, said casing being threaded into said mounting when in its tube-inclosing position.

4. The combination with a tire pump having a piston element and a flexible tube, of a protective casing adapted to cover the tube and be removably secured to a pump part, said piston element having an opening to receive said casing, said casing when removed from said flexible tube and inserted in said opening constituting a handle for operating said piston.

5. The combination with a tire pump having a piston element and a flexible tube, of a protective casing adapted to cover said flexible tube and be readily removably secured to a pump part, one end of said casing being tapered to form a prying tool, the piston element of said pump having means for securing said casing element thereto, the construction being such that by removing said casing from said flexible tube the casing may constitute a handle for operating the pump.

6. In a pump, the combination of a mounting, a pump cylinder and a flexible tube secured thereto, said mounting having a passageway leading from the interior of said cylinder to the interior of said flexible tube, a hollow piston stem within said cylinder, a piston head carried by said stem, a cap removably secured upon said piston stem, a tubular casing removably secured to said mounting so as to cover said flexible tube, said piston cap having provisions for the accommodation therein of said casing when removed from said mounting so as to constitute a handle for said pump.

7. The combination of a pump support adapted to be secured to a vehicle part, a pump having a piston therein, a ball and socket joint between said pump and said support, said joint having provisions whereby the pump may be readily removed from said support, said pump having a flexible tube adapted to connect with a tire nipple, a protective casing for said flexible tube, said casing being readily removable for access to said tube, the piston of said pump having provisions for the accommodation of said casing whereby said casing constitutes a handle for operating the pump.

8. The combination of a pump support adapted to be secured permanently to a vehicle part adjacent to the pneumatic tire of a wheel thereon, a piston pump, a connection between said piston pump and said support whereby the free end of the pump may be moved about into various relative positions when the pump is in use, a flexible tube in communication with the interior of the pump, said tube being adapted to be connected to the nipple of the tire, a casing adapted to be secured readily removably to a pump part and adapted to lie alongside the pump body and to inclose said tube when the pump is not in use, said connection having provisions for maintaining said pump positively in association with said connection against pulling and pushing strains exerted upon the pump, said connection also having provisions whereby said pump may be readily removed out of operative position, said connection remaining permanently secured to the vehicle part.

9. The combination of a piston pump, a pump support adapted to be secured to a vehicle part, said pump having a ball outstanding therefrom on a shank, said support having a socket adapted to accommodate the ball and to form therewith a ball and socket joint, said support including a slotted element adapted to provide a passageway for the shank of the ball and to hold the ball positively against pump operating strains in the direction of the axis of the pump.

10. The combination of a tire pump, a flexible tube leading from said pump, a casing for said flexible tube adapted to lie alongside said pump cylinder, and means associated with said casing and with said piston adapted to prevent said piston from moving longitudinally in said cylinder when the pump is not in use.

11. In a piston pump, the combination of a pump cylinder, a closure for an end thereof, said closure carrying a projection extending substantially within the cylinder and in the direction of the axis thereof, said closure and said projection having a passageway opening into said cylinder, said projection being spaced materially from the inner wall of said cylinder whereby a substantially large recess is formed between said projection and the inner wall of said cylinder, said recess being adapted to contain a quantity of grease, a piston operatively within said cylinder, said piston having a head adapted to slide frictionally upon the inner wall of said cylinder and having a portion thereof projecting in the direction of said closure, the projecting portion of said head being adapted to enter said recess and to contact grease therein, said projection constituting an obstruction to the passage into said passageway of grease within said recess.

HOWARD B. JONES.

Witnesses:
FRANKLIN M. WARDEN,
M. M. KRIESAND.

Copies of this patent may be obtained for five cents each, by addressing the "Commissioner of Patents, Washington, D. C."